United States Patent
Okada

(10) Patent No.: US 7,711,345 B2
(45) Date of Patent: May 4, 2010

(54) RECEIVING CIRCUIT AND RECEIVING METHOD

(75) Inventor: Hiroki Okada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 581 days.

(21) Appl. No.: 11/625,034

(22) Filed: Jan. 19, 2007

(65) Prior Publication Data

US 2007/0205913 A1 Sep. 6, 2007

(30) Foreign Application Priority Data

Feb. 16, 2006 (JP) .............................. 2006-039440

(51) Int. Cl.
*H04B 1/10* (2006.01)
*H04Q 7/20* (2006.01)

(52) U.S. Cl. ..................................... 455/306; 375/349

(58) Field of Classification Search ................. 455/303, 455/306, 552.1, 553.1; 333/100–101, 105, 333/110; 375/343, 349
See application file for complete search history.

(56) References Cited

U.S. PATENT DOCUMENTS 6,448,892 B1 9/2002 Delaporte 7,526,254 B2 * 4/2009 Toporski ...................... 455/45

FOREIGN PATENT DOCUMENTS

| DE | 600 18 237 T2 | | 1/2006 |
|---|---|---|---|
| GB | 2378331 | * | 2/2003 |
| JP | 11-317777 | | 11/1999 |
| JP | 2001-103024 | | 4/2001 |
| JP | 2003-72330 | | 3/2003 |
| JP | 2004-244851 | | 9/2004 |
| JP | 2005-236556 | | 9/2005 |
| JP | 2007-28276 | | 2/2007 |

* cited by examiner

*Primary Examiner*—Lee Nguyen
(74) *Attorney, Agent, or Firm*—Oblon, Spivak, McClelland, Maier & Neustadt, L.L.P.

(57) ABSTRACT

A received circuit receives a plurality signals generated by modulating carrier waves having the substantial same frequency according to digital signals having different bitrates output from a plurality of systems. The receiving circuit includes a front-end portion that tunes and outputs the signals received by an antenna; an analog-to-digital converting portion that converts the signals output from the front-end portion to digital signals; a signal processing portion that processes and demodulates the digital signals; and a plurality of digital filter portions each of which extracts a digital signal output from a corresponding system among the plurality of systems, from the demodulated signals output from the signal processing portion, based on a bitrate of the digital signal output from the corresponding system.

11 Claims, 4 Drawing Sheets

RECEIVING CIRCUIT AND RECEIVING METHOD

INCORPORATION BY REFERENCE

The disclosure of Japanese Patent Application No. 2006-39440 filed on Feb. 16, 2006 including the specification, drawings and abstract is incorporated herein by reference in its entirety.

BACKGROUND OF THE INVENTION

1. Field of the Invention

The invention relates to a receiving circuit, more specifically, to a receiving circuit and a receiving method that receive signals generated by modulating carrier waves having the substantially same frequency according to digital signals output from a plurality of systems.

2. Description of the Related Art

In recent years, the wireless smart key system has become widely available. In the wireless smart key system, a driver operates the portable device or the portable device responds to a request made by the vehicle-mounted device so as to lock or unlock the doors of the vehicle or to turn on the ignition switch to start the engine. The wireless smart key system uses a carrier wave in the frequency band of 300 MHz.

A tire pressure monitoring system (hereinafter abbreviated as "TPMS") monitors the tire pressure of the four wheels of the vehicle, and the pressure of a spare tire. TPMS is required by law in the United States, and therefore it is expected that TPMS will become further widespread in near future. This system also uses a carrier wave in the frequency band of 300 MHz.

Both systems use the radio waves in the frequency band of 300 MHz. However, the timings at which the radio waves are transmitted from the both systems are asynchronous, and radio interference may possibly occur. Accordingly, the frequency of the radio wave transmitted from the wireless smart key system is made different from the frequency of the radio wave transmitted from TPMS by several MHz to several tens of MHz so that the radio interference does not occur. In other words, a receiver is provided for each system.

Japanese Patent Application Publication No. JP-A-2005-236556 describes a receiver that receives radio waves from a remote key, a smart key, and tire pressure detection means, and extracts the baseband signals of the received radio waves. Then, the receiver demodulates the extracted baseband signals through the low-pass filter whose cut-off frequency is changed in accordance with a command signal, so that the desired signal is output.

Further, Japanese Patent Application Publication No. JP-A-2004-244851 describes a keyless receiving unit that can receive signals from the keyless entry system and signals from the tire pressure monitor. In addition, Japanese Patent Application Publication No. JP-A-2003-72330 describes a receiver for the keyless entry system that receives signals from the tire pressure sensor as well as signals from the keyless entry system.

The carrier waves used by the wireless smart key system and TPMS need to have the substantially same frequency so that one analog receiver can receive the signals from the both systems. In this case, however, radio wave interference occurs.

The timings at which the wireless smart key system and TPMS transmit signals are asynchronous. Also, the electric field strength of the signals at the analog receiver changes depending on the situation. Therefore, a problem arises that the receiver can receive signals from one of the systems, which have higher electric field strength, but cannot receive signals from the other system, which have lower electric field strength.

For example, in the wireless smart key system, the electric field strength of the signals at the analog receiver changes depending on where the user is. In TPMS, the transmitter is installed on a tire valve of each of the tires. Therefore, the positions of the transmitters when the transmitters transmit signals change as the tires rotate. Also, the electric field strength of the signals at the analog receiver changes depending on the reflectance of a road surface, and depending on the existence of reflective objects around the vehicle.

Therefore, whether the signals from the wireless smart key system or the signals from TPMS have higher electric field strength at the receiver depends on the situation. In particular, if the wireless smart key system cannot communicate when needed, the wireless smart key system cannot be operated as expected by the user. This makes the user feel unsatisfied.

In the receiver described in Japanese Patent Application Publication No. JP-A-2005-236556, the cut-off frequency of the low-pass filter is changed in accordance with the command signal. Thus, when signals from the smart key and signals from the tire pressure detection means are received at the same time, the receiver can receive only the signals from one of the system, which have higher electric field strength.

When the frequency of the signals from the smart key is set to 700 Hz and the frequency of the signals from TPMS is set to 5 KHz as shown in FIG. 1A, the frequency of the signals from TPMS (e.g. 5 KHz) is significantly attenuated as shown in FIG. 1B if the cut-off frequency of the low-pass filter is set to 1 KHz so that the signals from the smart key pass through the filter.

In contrast, if the cut-off frequency of the low-pass filter is set to 5.2 KHz so that the signals from TPMS pass through the filter as shown in FIG. 1C, the frequency of the signals from the smart key is not attenuated and mixed with the signals from TPMS as noise.

SUMMARY OF THE INVENTION

The invention provides a receiving circuit that can receive signals generated by modulating carrier waves according to digital signals output from a plurality of systems, and extract the digital signal output from each of the systems.

A first aspect of the invention relates to a receiving circuit that receives a plurality of signals generated by modulating carrier waves having the substantially same frequency according to digital signals having different bitrates output from a plurality of systems. The receiving circuit includes: a front-end portion that tunes and outputs the signals received by an antenna; an analog-to-digital converting portion that converts the signals output from the front-end portion to digital signals; a signal processing portion that processes and demodulates the digital signals; and a plurality of digital filter portions each of which extracts a digital signal output from a corresponding system among the plurality of systems, from the demodulated signals output from the signal processing portion, based on a bitrate of the digital signal output from the corresponding system. As a result, one circuit can receive signals generated by modulating carrier waves according to digital signals output from a plurality of systems, and extract the digital signal output from each of the systems.

A second aspect of the invention relates to a receiving circuit that receives a plurality of signals generated by modulating carrier waves having the substantially same frequency according to digital signals having different bitrates output from a plurality of systems. The receiving circuit includes: a front-end portion that tunes and outputs the signals received by an antenna; an analog-to-digital converting portion that converts the signals output from the front-end portion to digital signals; a signal processing portion that processes and demodulates the digital signals; and a variable digital filter portion in which a passband is switched in accordance with a bitrate of a digital signal output from a system designated among the plurality of systems, and which extracts the digital signal output from the designated system, from the demodulated signals output from the signal processing portion. As a result, one circuit can receive signals generated by modulating carrier waves according to digital signals output from a plurality of systems, and extract the digital signal output from each of the systems.

A third aspect of the invention relates to a method of receiving a plurality of signals generated by modulating carrier waves having the substantially same frequency according to digital signals having different bitrates output from a plurality of systems. In the method, the signals received by an antenna are tuned and output; the output signals are converted to digital signals; the digital signals are processed and demodulated; and a digital signal output from each of the plurality of systems is extracted, from the demodulated signals, based on a bitrate of the digital signal output from each of the plurality of systems. As a result, one circuit can receive signals generated by modulating carrier waves according to digital signals output from a plurality of systems, and extract the digital signal output from each of the systems.

A fourth aspect of the invention relates to a method of receiving a plurality of signals generated by modulating carrier waves having the substantially same frequency according to digital signals having different bitrates output from a plurality of systems. In the method, the signals received by an antenna are tuned and output; the output signals are converted to digital signals; the digital signals are processed and demodulated; a passband of a digital filter is switched in accordance with a bitrate of a digital signal output from a system designated among the plurality of systems; the demodulated signals are passed through the digital filter; and the digital signal output from the designated system is extracted, from the demodulated signals. As a result, one circuit can receive signals generated by modulating carrier waves according to digital signals output from a plurality of systems, and extract the digital signal output from each of the systems.

In the receiving circuit, the plurality of systems may include a wireless smart key system and a tire pressure monitoring system.

According to the aspects of the invention, one circuit can receive signals generated by modulating carrier waves according to digital signals output from a plurality of systems, and extract the digital signal output from each of the systems.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

The embodiments of the invention will be described with reference to the attached drawings.

As a precondition of the invention, a wireless smart-key system transmits signals generated by modulating a carrier wave having the frequency of, for example, 314 MHz, by means of frequency-shift keying (FSK) according to digital signals having the bitrate of, for example, 700 bps. TPMP transmits signals generated by modulating a carrier wave having the frequency of, for example, 314 MHz, by means of FSK according to digital signals having the bitrate of, for example, 5 Kbps. Note that, the frequency of the carrier wave used by the wireless smart key system may differ from the frequency of the carrier wave used by TPMS by approximately several tens KHz.

First Embodiment

Figure 1A:
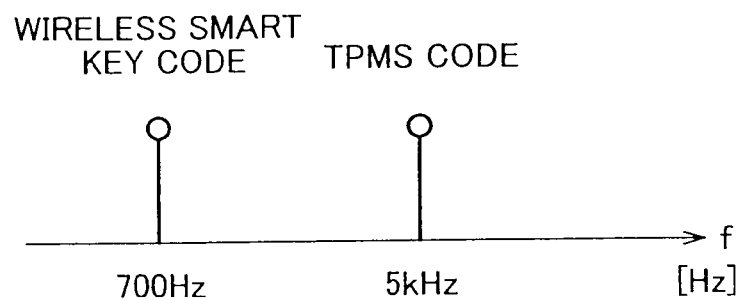
FIGS. 1A to 1C are views illustrating the characteristics of conventional analog filters.
Figure 1B:
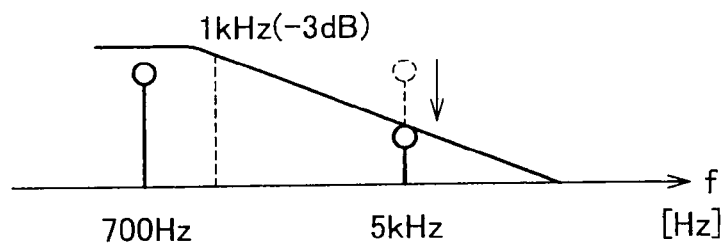
Figure 1C:
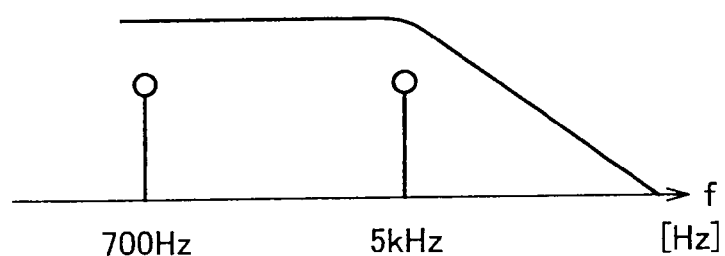
Figure 2:
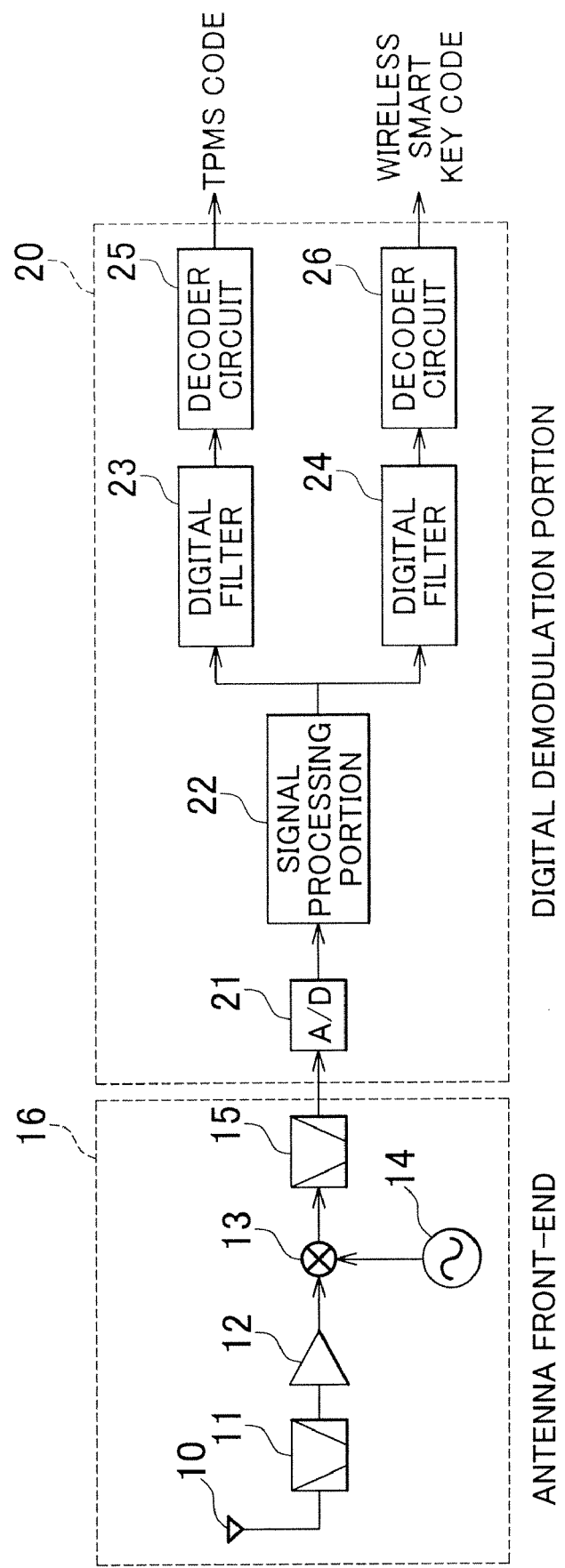
FIG. 2 is a view illustrating the circuit structure of a receiving circuit according to a first embodiment of the invention.

FIG. 2 schematically shows the circuit structure of a receiving circuit according to a first embodiment of the invention. In FIG. 2, an antenna 10 receives signals, and the received signals are sent to a filter 11. The signals are filtered by the filter 11. That is, only the signals in the frequency band of, for example, 314 MHz, pass through the filter 11. The signals filtered by the filter 11 are amplified by a preamplifier 12 and sent to a mixer 13. The mixer 13 mixes the filtered signals with local oscillation signals output from a local oscillator 14 to produce intermediate frequency signals (hereinafter, "IF signals"). The IF signals are sent to an IF filter 15, and unnecessary frequency components are removed from the IF signals by the IF filter 15. The block of the devices from the antenna 10 to the IF filter 15 is collectively referred to as an antenna front-end 16.

The IF signals output from the IF filter 15 are sent to an AD converter 21 provided in a digital demodulation portion 20 without being limited using a limiter amplifier. The IF signals are converted into the digital IF signals. The digital IF signals in a relatively wide band (e.g. 30 KHz or below) are processed and demodulated by means of FSK by a signal processing portion 22. The demodulated signals output from the signal processing portion 22 are sent to digital filters 23, 24.

Figure 3:
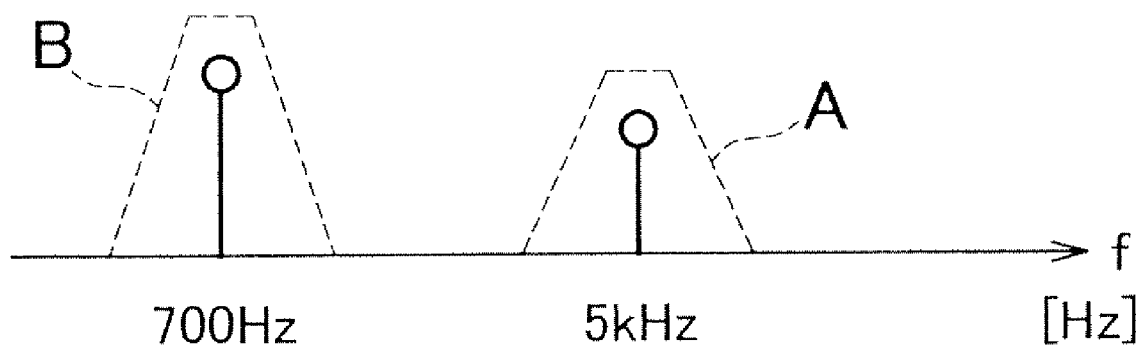
FIG. 3 is a view illustrating the characteristics of digital filters according to the invention.

As shown by a broken line A in FIG. 3, the digital filter 23 is a band-pass filter in which the center frequency in the passband is 5 KHz. The digital filter 23 extracts signals output from TPMS (hereinafter referred to as "TPMS signals") whose bitrate is 5 Kbps. The extracted TPMS signals are sent to a decoder circuit 25. The decoder circuit 25 decodes the TPMS signals so as to output TPMS codes.

As shown by a broken line B in FIG. 3, the digital filter 24 is a band-pass filter in which the center frequency in the passband is 700 Hz. The digital filter 24 extracts signals output from the wireless smart key system (hereinafter, referred to as "wireless smart key signals") whose bitrate is 700 bps. The extracted wireless smart key signals are sent to a decoder circuit 26. The decoder circuit 26 decodes the wireless smart key signals so as to output wireless smart key codes.

It should be noted that in a conventional analog circuit as described in Japanese Patent Application Publication No. JP-A-2005-236556, the IF signals are detected by means of FSK after being limited by the limiter amplifier. Therefore, even when the signals transmitted from wireless smart key and the signals transmitted from tire pressure detection means are received at the same time, either the signals transmitted from wireless smart key or the signals transmitted from the tire pressure detection means, which have higher electric field strength, are detected, and the signals with lower electric field strength are not detected due to poor signal-to-noise ratio (SN ratio). This phenomenon is called the "capture effect".

In the first embodiment, however, the signals are converted into digital signals without being limited, and the digital signals in the relatively wide frequency band (e.g. 30 KHz or below) are processed and demodulated by means of FSK. Therefore, regardless of the electric field strength, the demodulated signals include both of the TPMS signals and the wireless smart key signals, and the TPMS signals and the wireless smart key signals can be separated from each other by the digital filters 23, 24.

Second Embodiment

Figure 4:
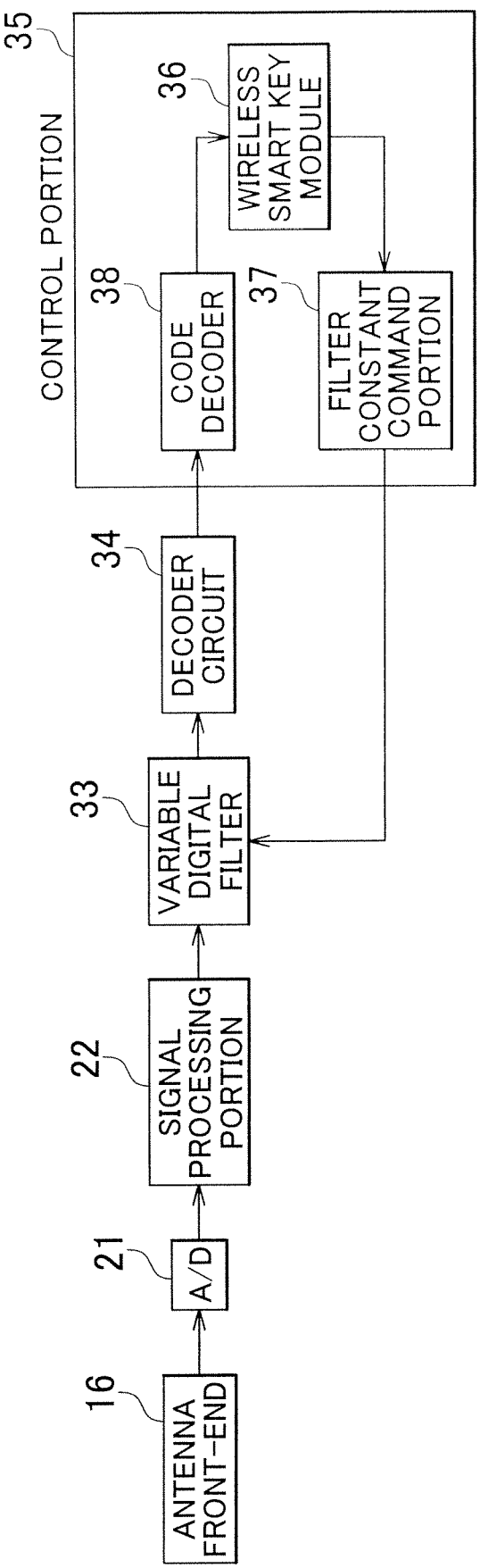
FIG. 4 is a view illustrating the circuit structure of a receiving circuit according to a second embodiment of the invention.

FIG. 4 schematically shows the circuit structure of a receiving circuit according to a second embodiment of the invention. In FIG. 4, the antenna front-end 16, the AD converter, and the signal processing portion 22 have the same structures as in FIG. 2, and therefore detailed description thereof will be omitted.

A variable digital filter 33 is a band-pass filter in which the center frequency in the passband is switched between 5 KHz and 700 Hz in accordance with a command output from a control portion 35. The variable digital filter 33 extracts the TPMS signals having the bitrate of 5 Kbps when the center frequency in the passband is 5 KHz. The variable digital filter 33 extracts the wireless smart key signals having the bitrate of 700 bps when the center frequency in the passband is 700 Hz. Then, the extracted signals are sent to a decoder circuit 34 in both cases. The decoder circuit 34 decodes the TPMS signals or the wireless smart key signals so as to output the TPMS code or the wireless smart key code.

The control portion 35 includes a wireless smart key module 36, a filter constant command portion 37, and a code decoder 38. The wireless smart key code that is output from the decoder circuit 34 is decoded by the code decoder 38 and sent to the wireless smart key module 36.

The wireless smart key module 36 of the control portion 35 transmits a request signal to the portable device of the wireless smart key system when the control portion 35 communicates with the portable device. Then, the portable device responds to the request signal. Thus, the communication therebetween is established in this manner.

A request signal transmitted from the wireless smart key module 36 is sent to the filter constant command portion 37. Then, the filter constant command portion 37 transmits a command signal to the variable digital filter 33 so that the center frequency in the passband of the variable digital filter 33 is set to 700 Hz for a predetermined time (e.g., several seconds) from the reception of the request signal at the filter constant command portion 37. Further, during the time other than the aforementioned predetermined time, the command signal is transmitted to the variable digital filter 33 so that the center frequency in the passband is set to 5 KHz.

In the second embodiment, when the communication with the wireless smart key system and the communication with TMPS occur at the same time, the communication with the wireless smart key system is always given priority over the communication with TMPS. However, the communication with the wireless smart key system does not frequently occur. In addition, control is executed to lock/unlock the doors of the vehicle, or to turn on the ignition switch to start the engine while the vehicle is stopped. In contrast, monitoring of the tire pressure is important and necessary to be performed when the vehicle is running. For example, if TPMS detects that the tire pressure decreases while the vehicle is running, control is executed to stop the vehicle. Thus, the TPMS requires communication in a situation different from the situation where the wireless smart key system requires communication. As a result, no problem arises even if the communication with the wireless smart key system is always given priority over the communication with TPMS.

In the second embodiment, the variable digital filter 33 and the decoder circuit 34 are commonly used for both of the wireless smart key system and TPMS. That is, both of the wireless smart key code and the TPMS code can be extracted by commonly using the variable digital filter 33 and the decoder circuit 34, and therefore there is no need for providing a plurality of digital filters and decoder circuits. As a result, the size of the circuit can be made smaller than that of the first embodiment.

As well as the wireless smart key system and TPMS, another system may transmit signals generated by modulating a carrier wave having the substantially same frequency according to digital signals having a bitrate different from those of the digital signals output from the wireless smart key system and TPMS. The receiving circuit may extract the digital signals output from the other system in the same manner as the manner in which the digital signals output from the wireless smart key system and TPMS are extracted.

Note that, in the aforementioned embodiments, the antenna front-end 16 converts the received signals to the IF signals by changing the frequency, and the AD converter converts the IF signals to the digital IF signals. Subsequently, the signal processing portion demodulates the digital IF signals by means of FSK. Other methods may be employed in addition to this method. That is, it is possible to employ the method in which the antenna front-end tunes signals in the frequency band of 314 MHz; the AD converter converts the signals to the digital signals; and the signal processing portion demodulates the digital signals by means of FSK. Alternatively, it is possible to employ the method in which the antenna front-end directly converts the received signals in the frequency band of 314 MHz, to the baseband signals having the frequency ranging from 700 Hz to 5 KHz, that is, the antenna front-end performs direct conversion; the AD converter converts the baseband signals to digital signals; and the signal processing portion demodulates the digital signals by means of FSK.

Note that, the antenna front-end 16 and the AD converter 21 may be considered as the antenna front-end portion and the analog-to-digital converting portion of the invention, respectively. The signal processing portion 22, the digital filters 23, 24, and the variable digital filter 33 may be considered as the signal processing portion, a plurality of digital filter portions, and the variable digital filter portion of the invention, respectively.

What is claimed is:

1. A receiving circuit that receives a plurality of digital signals output from a wireless smart key system and a tire pressure monitoring system, comprising:

an antenna that receives the plurality of signals generated by modulating carrier waves having a substantially same frequency according to digital signals having different bitrates output from the wireless smart key and tire pressure systems;

a front-end portion that tunes and outputs the signals received by the antenna;

an analog-to-digital converting portion that converts the signals output from the front-end portion to digital signals;

a signal processing portion that processes and demodulates the digital signals;

a transmitting portion that transmits a request signal to a portable device: and a variable digital filter portion in which a passband is switched in accordance with a bitrate of a digital signal output from the wireless smart key system for a predetermined time after the transmitting portion transmits the request signal to the portable device, and which extracts the digital signal output from the wireless smart key system from the demodulated signals output from the signal processing portion.

2. The receiving circuit according to claim 1, wherein the variable digital filter portion is connected to the signal processing portion.

3. The receiving circuit according to claim 1, wherein the demodulated signals are input to the variable digital filter portion.

4. The receiving circuit according to claim 1, wherein the wireless smart key and tire pressure systems generate the signals by modulating the carrier waves using frequency shift keying, and the signal processing portion demodulates the digital signals using frequency shift keying.

5. The receiving circuit according to claim 1, wherein the front end portion tunes and outputs the signals received by the antenna without limiting the signals using a limiter amplifier.

6. A method of receiving a plurality of digital signals output from a wireless smart key system and a tire pressure monitoring system; comprising:

receiving the plurality of signals generated by modulating carrier waves having a substantially same frequency according to digital signals having different bitrates output from the wireless smart key and tire pressure systems;

tuning and outputting the signals received by an antenna;

converting the output signals to digital signals;

processing and demodulating the digital signals;

transmitting a request signal to a portable device;

switching a passband of a variable digital filter in accordance with a bitrate of a digital signal output from the wireless smart key system for a predetermined time after transmitting the request signal to the portable device; and extracting the digital signal output from the wireless smart key system from the demodulated digital signals.

7. The method of receiving according to claim 6, wherein the wireless smart key and tire pressure systems generate the signals by modulating the carrier waves using frequency shift keying, and the processing and demodulating includes demodulating the digital signals using frequency shift keying.

8. The method of receiving according to claim 6, wherein the tuning and outputting is accomplished without limiting the signals using a limiter amplifier.

9. A method of receiving a plurality of digital signals from a wireless smart key system and a tire pressure monitoring system, comprising:

receiving the plurality of signals generated by modulating carrier waves having a substantially same frequency according to digital signals having different bitrates output from the wireless smart key and tire pressure systems;

tuning and outputting the signals received by an antenna;

converting the output signals to digital signals;

processing and demodulating the digital signals;

transmitting a request signal to a portable device;

switching a passband of a variable digital filter in accordance with a bitrate of a digital signal output from a system designated among the wireless smart key and tire pressure systems; and extracting the digital signal output from the designated system, from the demodulated signals, by passing the demodulated signals through the variable digital filter.

10. The method of receiving according to claim 9, wherein the wireless smart key and tire pressure systems generate the signals by modulating the carrier waves using frequency shift keying, and the processing and demodulating includes demodulating the digital signals using frequency shift keying.

11. The method of receiving according to claim 9, wherein the tuning and outputting is accomplished without limiting the signals using a limiter amplifier.

* * * * *